United States Patent [19]
Brown et al.

[11] Patent Number: 5,483,436
[45] Date of Patent: Jan. 9, 1996

[54] GATE DRIVE POWER SUPPLY OPERABLE FROM A SOURCE OF UNREGULATED DC ELECTRIC POWER

[75] Inventors: Herbert J. Brown; Philip R. Cooke; Donald D. Bock, all of Erie, Pa.

[73] Assignee: General Electric Company, Erie, Pa.

[21] Appl. No.: 114,023

[22] Filed: Aug. 30, 1993

[51] Int. Cl.⁶ ............................................. H02M 7/5395
[52] U.S. Cl. ............................ 363/98; 323/222; 323/269
[58] Field of Search ................................. 323/222, 269; 363/17, 89, 98, 132

[56] References Cited

U.S. PATENT DOCUMENTS

| | | | |
|---|---|---|---|
| 4,092,711 | 5/1978 | Gerding et al. | 363/89 |
| 4,467,268 | 8/1984 | Chambers et al. | 323/222 |
| 4,533,986 | 8/1985 | Jones | 363/17 |
| 4,761,722 | 8/1988 | Pruitt | 363/17 |
| 4,970,451 | 11/1990 | Suomalainen | 323/222 |
| 5,181,169 | 1/1993 | Murugan | 363/17 |
| 5,282,126 | 1/1994 | Husgen | 323/222 |
| 5,359,274 | 10/1994 | Bandel | 323/222 |
| 5,373,195 | 12/1994 | De Doncker et al. | 323/222 |

*Primary Examiner*—Jeffrey L. Sterrett
*Attorney, Agent, or Firm*—Ann M. Kratz; Marvin Snyder

[57] ABSTRACT

A power supply for a gate drive voltage supply system for a power inverter is coupled to receive a variable DC voltage and operable to produce a regulated DC output voltage to each of a plurality of distributed electronic switching devices. The system includes a plurality of linear voltage regulators with each respective one of the regulators having a power input terminal coupled to a common DC link. Each of the regulators is separately connected to a ground reference at a ground reference power terminal of a corresponding one of the switching devices so as to eliminate ground loops and voltage drops over a common ground bus.

6 Claims, 4 Drawing Sheets

5,483,436

GATE DRIVE POWER SUPPLY OPERABLE FROM A SOURCE OF UNREGULATED DC ELECTRIC POWER

BACKGROUND OF THE INVENTION

The present invention relates to electric power control systems and, more particularly, to a system for obtaining power supply control voltages for semiconductor switching regulators in which the control voltages can exceed the system input voltage.

Alternating current electric motor propulsion systems typically utilize direct current (DC) electric power to develop alternating current (AC) electric power at a regulated voltage and frequency. DC power may be generated on-board by an internal combustion engine driving an electric alternator subsystem or be obtained externally from an overhead catenary subsystem or from a third-rail system. In each situation, an inverter employing solid-state or semiconductor devices is used to convert the DC to AC power. In some systems, the inverter utilizes power gate-turnoff (GTO) devices. These GTO devices require gate drive circuits to provide current and voltage of relatively precise values in order to assure that the devices are gated into and out of conduction at precise times. In order to achieve this function, the power supplied to the gate drive circuits must be precisely regulated.

One form of power supply for an inverter gate drive circuit uses a two stage converter to generate the precise voltage for the gate drive circuit. A first stage of the converter comprises a boost circuit which boosts a variable input, relatively low DC voltage to a substantially regulated higher voltage. A second stage of the converter comprises an inverter which converts the DC voltage from the boost circuit to an AC voltage, which AC voltage is transformer coupled to the gate drive circuit to achieve galvanic isolation. Both the boost circuit and the inverter utilize pulse width modulation controllers for controlling the on and off times of switching devices in each of the boost circuit and inverter. Further, the switching devices necessitate additional gate drive circuits in the power supply for supplying gate drive signals to the switching devices. Regulated power for these additional gate drive circuits is usually obtained by conventional integrated circuit (IC) devices specifically designed as linear voltage regulators. Such regulators obtained power from the boost circuit and have their ground reference terminals connected to a common ground reference terminal of the boost circuit. One problem with such regulators is that the common ground reference establishes ground loops between the separated power supply stages. Additionally, at high current levels, voltage drops in a ground reference bus coupling the boost circuit to the inverter creates a ground reference voltage difference between the coupled converter stages.

Summary of the Invention

The present invention overcomes the above and other disadvantages of the prior art in an inverter gate drive power supply by isolating the switching device control circuits from the associated switching devices using optical couplers and by using multiple linear voltage regulators for supplying a regulated voltage to each gate drive and associated control circuit with each regulator being referenced to a ground terminal corresponding to the switching device coupled to each respective gate drive. In an illustrative form, the invention includes a power supply for a gate drive circuit of a power inverter operable from a source of unregulated DC electric power for providing a desired value of regulated voltage and having an input filter circuit connectable to an unregulated DC electric power source for providing a filtered value of an input voltage.

A voltage boost circuit is coupled to the input filter circuit and provides a link voltage which is relatively high with respect to the desired value of regulated voltage. The boost circuit includes at least one modulated solid state switching device selectively switchable between conducting and non-conducting states in response to switching signals. A first control circuit provides control signals for selectively switching the switching device between conducting and non-conducting states. The control circuit is connected for monitoring the link voltage and providing control signals for controlling the conducting and non-conducting states in a manner to adjust the link voltage toward a desired value. A first gate drive circuit is coupled between the first control circuit and the boost circuit for receiving the control signals from the first control circuit and for supplying gate drive or switching signals at a regulated power to the switching device in response to control signals.

A first linear voltage regulator is coupled to receive the link voltage and has a voltage reference terminal connected to a voltage reference terminal of the filter circuit. The first regulator provides a regulated DC voltage to the first control circuit. A second linear voltage regulator is coupled to receive the link voltage and has a voltage reference terminal connected to an output terminal of the switching device. The second regulator provides a regulated DC voltage to the gate drive circuit for the switching device in the boost circuit.

The power supply further includes an inverter having solid state switching devices in each of a pair of switching legs. The inverter is connected to the DC link voltage and has a voltage reference terminal connected to the voltage reference terminal of the filter circuit. A second control circuit provides signals for selectively switching each of the inverter switching devices between conducting and non-conducting states such that the inverter provides an alternating current output at a selected voltage. A second gate drive circuit is coupled between the second control circuit and the switching devices in one of the inverter legs. The second gate drive circuit receives signals from the second control circuit and supplies gate drive signals at a regulated power to the associated switching devices in response to the signals. A third gate drive circuit is coupled between the second control circuit and the switching devices in another of the inverter legs. The third gate drive circuit receives signals from the second control circuit and supplies gate drive signals at a regulated power to the switching devices in response to the latter signals.

A third linear voltage regulator is coupled to the DC link voltage and has a voltage reference terminal connected to the power output terminal of one of the switching devices in the one of the inverter legs for providing a regulated DC voltage to the second gate drive circuit. A fourth linear voltage regulator is coupled to the DC link voltage and has a voltage reference terminal connected to the power output terminal of one of the switching devices in the another inverter leg for providing a regulated DC voltage to the third gate drive circuit.

The power supply further includes optical signal couplers between each control circuit and each associated gate drive circuit.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1:
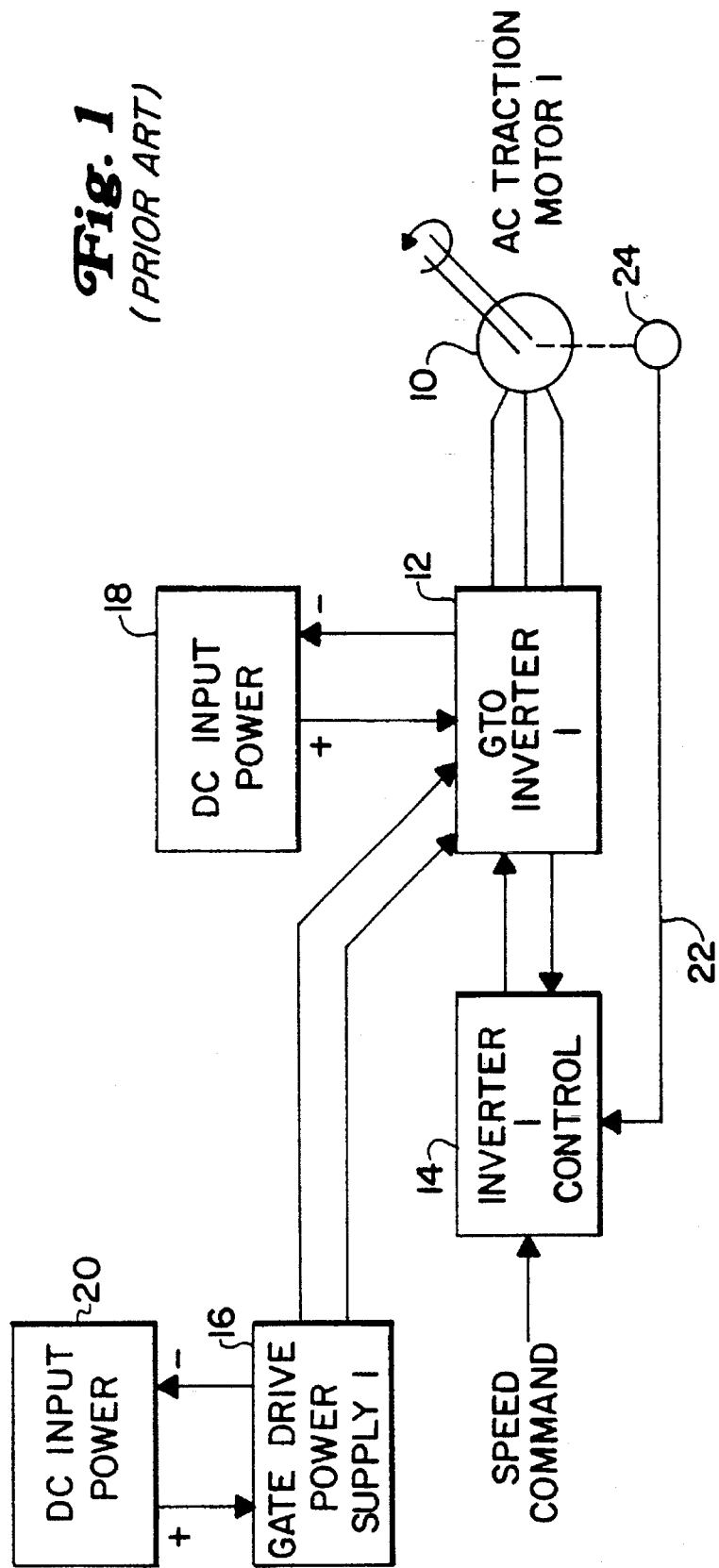
FIG. 1 is a simplified block diagram of an alternating current electric motor propulsion system.

FIG. 1 is a simplified block diagram of an alternating current (AC) electric motor propulsion system with which the present invention may be used. The system includes an AC electric motor 10 coupled to be powered from a solid state inverter 12. A control system 14, responsive to various stimuli such as a speed or torque command and an actual speed signal, controls the operation of inverter 12 so as to tend to minimize any difference between a command parameter, such as speed, and a sensed parameter, such as actual speed. The inverter 12 preferably comprises a conventional three phase inverter using gate turn-off (GTO) semiconductor switching devices for inverting direct current (DC) power to AC power in a manner well known in the art.

The proper operation of the inverter 12 requires a relatively well regulated DC voltage for generating gate drive signals to the GTO devices in the inverter. Typically, it is desirable to provide gate drive voltage source signals whose voltage amplitude is regulated to within about ±7% of a nominal value. For example, in an inverter in which the nominal gate drive voltage source is 25 volts, the system may shut down if the drive voltage drops below 23 volts. Such shut down is necessary since the response of the GTO devices to gating signals can be erratic if the voltage level of such signals falls outside the allowable tolerance. Circuitry for effecting shut down of the gate drive circuit of inverter 12 is incorporated into the inverter and may be implemented through a comparison of the input DC voltage to a reference voltage.

DC voltage for the inverter gate drive circuit is supplied by a battery/battery charger 20 through a gate drive power supply 16. The gate drive voltage is independent of the inverter DC power, block 18, which power is inverted and supplied to drive motor 10. The supply 16 provides the highly regulated voltage necessary to affect proper operation of the GTO devices in the inverter as described above.

During normal operation, a SPEED COMMAND signal may be applied to an inverter/power control circuit 14, which circuit compares the commanded speed to a speed feedback signal on line 22 from a speed sensor 24 such as, for example, a tachometer. Circuit 20 uses the generated error signal (commanded speed minus actual speed) to control gating signals to the GTO devices in inverter 12 in a manner to minimize the error.

Figure 2:
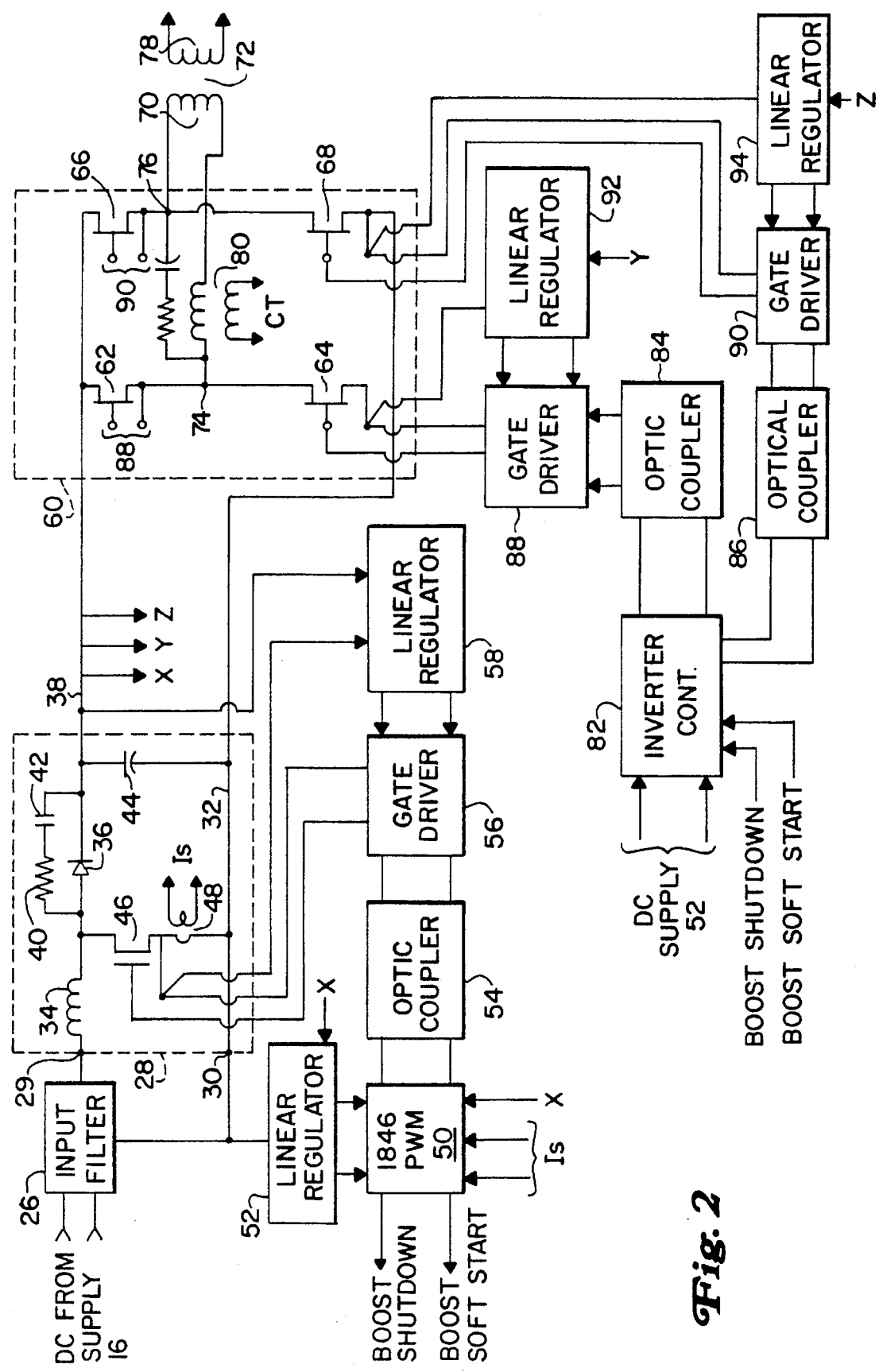
FIG. 2 is a simplified block diagram of a gate drive power supply according to the present invention.

Turning now to FIG. 2, there is shown a simplified schematic of an inverter gate drive power supply which may be used for the supply 16. DC input power is applied to an EMI filter 26 of conventional design. In an illustrative application, the inverter power system of FIG. 1 may be utilized in an electric traction motor power vehicle in which motor 10 is connected in driving relationship with one or more wheels of the vehicle and the DC input power is supplied from a combination of on-board battery and battery charger. In such applications, the DC input power varies as a function of load and whether or not the battery charger is operating. During charging, the DC input power typically ramps up toward a peak value, e.g., 32 volts. With the charger off, the power ramps down toward a minimum average voltage, e.g., 15 volts. However, transiently, the DC input power may drop to less than 15 volts DC. If the required minimum voltage for the inverter gate drive supply is 15 volts, transient drops below this value may result in inverter drop-out. The supply 16 avoids drop-out under short transient conditions by boosting the input power to a significantly higher voltage which is then regulated down to a desired operating level.

In FIG. 2, the filtered DC input power is coupled from filter 26 to voltage boost circuit 28, which circuit 28 is designed to boost the input voltage to a nominal 55 volt DC value. Circuit 28 includes a pair of input terminals 29, 30 with the terminal 30 being connected through the supply 16 as a first voltage reference terminal or circuit ground, i.e., terminal 30 connects to voltage reference line 32. Terminal 29 connects to input inductor 34, which inductor 34 is serially connected with diode 36 to output DC link 38 at which link the boost circuit voltage or DC link voltage appears. A transient filter comprising the serial combination of resistor 40 and capacitor 42 shunts diode 36. An output filter capacitor 44 is connected between DC link 38 and reference line 32. A controllable switching device, illustrated as a power FET 46, is connected between a junction intermediate inductor 34 and diode 36 and reference line 32. A current transformer (CT) 48 coupled to the source terminal of FET 46 provides an indication of current $I_s$ in FET 46 and inductor 34.

In operation, the FET 46 is gated into conduction to establish a predetermined current in inductor 34 as measured by CT 48. When the predetermined current is achieved, the FET 46 is gated out of conduction and the reactance of inductor 34 causes the current to charge capacitor 44. By sequentially gating FET 46 into and out of conduction, the level of voltage on capacitor 44 (the DC link voltage) can be substantially controlled. The DC link voltage (signal x entering controller 52) is controlled by a pulse width modulation (PWM) controller 50 which may be a current mode PWM controller, type UC1846 manufactured by Unitrode Integrated Circuits Corp. of Merrimack, N.H. Controller 50 is coupled to receive current signals $I_s$ from CT 48 and is powered from a linear voltage regulator 52 such as a Texas Instruments Inc., type TL783C. Control signals from controller 50 are coupled through an optical coupler 54 to a gate drive circuit 56, which circuit 56 is connected to supply gating signals to a gate terminal of FET 46. The FET 46 may be a hexpak power module type IRFK4H250 available from International Rectifier Corp. DC power for the gate drive circuit 56 is supplied by another linear voltage regulator 58 which is also preferably a type TL783.

It can be seen that the regulator 58 receives power from DC link 38 but that its ground reference is coupled to the drain terminal of FET 46. As previously described, prior systems have used a single ground voltage point in the power circuit. As the output power level requirements of the system increase, the electrical noise level increases, making it increasingly difficult to stabilize the system to regulate the DC link voltage in the presence of ground loops and voltage differences over the ground lines. The present invention overcomes these problems by using multiple voltage regulators each coupled to a ground or voltage reference at the switching device for which the regulated voltage is required. It will be noted that the type IRFK4H250 includes an auxiliary source connector which is available for making a gate drive source return or ground connection.

The actual output of the supply 16 is an alternating current at a selected frequency and amplitude, for example, 25 kHz at 110 volts rms. This AC power is developed from the DC link voltage using an inverter 60. The inverter 60 is a conventional H-bridge inverter having a pair of power MOSFET's 62,64 in one leg and a pair of power MOSFET's 66, 68 in another leg. The MOSFET's may be the type IRFK4H250 identified above. The two legs of inverter 60 are connected in parallel between the DC link 38 and ground reference line 32. A primary winding 70 of a transformer 72 is coupled between the junctions 74, 76 intermediate the two legs of the inverter 60. Secondary winding 78 of transformer 72 provides the AC output of the supply 16. A current transformer (CT) 80 is coupled in circuit with primary winding 70 to provide an indication of inverter current.

The MOSFET's 62–68 are controlled by a pulse width modulation (PWM) circuit 82 which may be a type UC1525 produced by Unitrode Integrated Circuits Corp. Circuit 82 gates the MOSFET's into and out of conduction in a conventional manner to generate a highly regulated, essentially square wave alternating current power waveform. This alternating current power is coupled to the GTO inverter 12 where it is rectified by a full wave bridge rectifier (not shown) to produce a highly regulated DC voltage. This regulated DC voltage is used by the inverter gate drive circuit to produce precise gate drive voltages for the GTO devices of the inverter 12.

PWM circuit 82 is operatively coupled through a pair of optical couplers 84 and 86 to corresponding ones of a pair of gate drive circuits 88 and 90. The optical couplers 84, 86 may be a type HCPL2212 available from Hewlett Packard Corp. and the gate drive circuits 88, 90 may utilize a type IR2110 FET integrated circuit drive available from International Rectifier Corp. Each gate drive circuit 88, 90 is coupled to the FET's in one of the legs of inverter 60. In particular, circuit 88 is coupled to FET's 62, 64 and circuit 90 is coupled to FET's 66, 68. Each circuit 88 and 90 is powered from a separate DC supply or linear voltage regulator, i.e. circuit 88 is powered from supply 92 and circuit 90 is powered from supply 94. Each supply 92, 94 is coupled to DC link 38 for receiving the nominal 55 volt link voltage. However, the ground or voltage reference for each supply is coupled to a source terminal of one of the FET's with which the supply is associated. For example, supply 92 uses the source terminal of FET 64 as a voltage reference while supply 94 uses the source terminal of FET 68 as a voltage reference. By closely coupling the ground or voltage reference to the devices associated with the supply, the aforementioned ground loop and noise problems are minimized. Each of the DC power supplies may be a type TL783.

It will be appreciated that the inventive system allows for use of linear voltage regulators that have poor minimum drop out voltage, i.e., the voltage drop from input to output of the regulator may be between four and five volts, and yet obtain a regulated output voltage which can exceed the input voltage to a boost converter stage. In the illustrative system, regulation occurs for DC link voltages which are five volts higher than the desired regulated voltage level. For example, the regulators 92 and 94 can provide a regulated 15 VDC output so long as the DC link voltage is at least 20 volts DC. Since the normal regulated voltage at the DC link 38 is about 55 volts, the regulators, such as regulators 92 and 94, can maintain a regulated 15 volt DC output even if the input voltage to the EMI filter 26 drops to a value less than 20 volts.

In addition to the advantages stated above, including the advantages of eliminating ground voltage drops in the power return bus and associated noise, the illustrative system also incorporates a self-starting feature and an auto-shutdown. Self-starting and auto-shutdown are achieved by a comparison circuit which compares the boost voltage to a reference voltage and provides a signal to a shutdown terminal on the boost power control IC 50. The type 1525 integrated circuit incorporates a shutdown function for this purpose. Further, the system incorporates a soft-start which is also implemented by a charging capacitor connected to a soft-start terminal of the IC 50. These advantages enable the present system to operate at at least twice the peak power rating of prior systems while still using the same type control circuits due to the reduction of electrical noise. For example, a prior system which tolerated the high noise and ground voltage drops operated at a peak power rating of 300 watts while the present system is capable of operating at 700 watts peak.

In operation, as voltage is applied to the EMI filter 26, that same voltage minus a diode drop (diode 36) appears across capacitor 44 at link 38. When the DC link voltage reaches about 13 volts, the regulated voltage from regulator 52, assuming a 5 volt drop out voltage, reaches about 8 volts. In the preferred embodiment, 8 volts is a trigger point for PWM controller 50 (which controller also includes a shutdown feature incorporated in the UC1846 IC) which then begins to gate FET 46 so as to boost the voltage on DC link 38 to 55 volts. The boost circuit 28 operates at a fast rate so that the link voltage reaches 55 volts prior to the soft-start circuit associated with boost controller 50 being operative to allow inverter controller 82 to begin operation. The soft-start delay is controlled by the size of capacitor coupled to the soft-start terminal of the UC1846 IC used in the boost controller 50. Once started, the system continues operation so long as the nominal EMI filter voltage remains greater than 13 volts, although operation will continue so long as the input voltage only transiently drops below 13 volts. However, the system does incorporate a current limit shutdown when the input voltage falls below 15 volts at maximum power output. Output current is also monitored by CT 80 whose signal output is rectified and applied to a comparator for comparison to a selected reference value equivalent to a selected current limit. The output of the comparator is applied to the inverter controller shutdown circuit.

Figure 3:
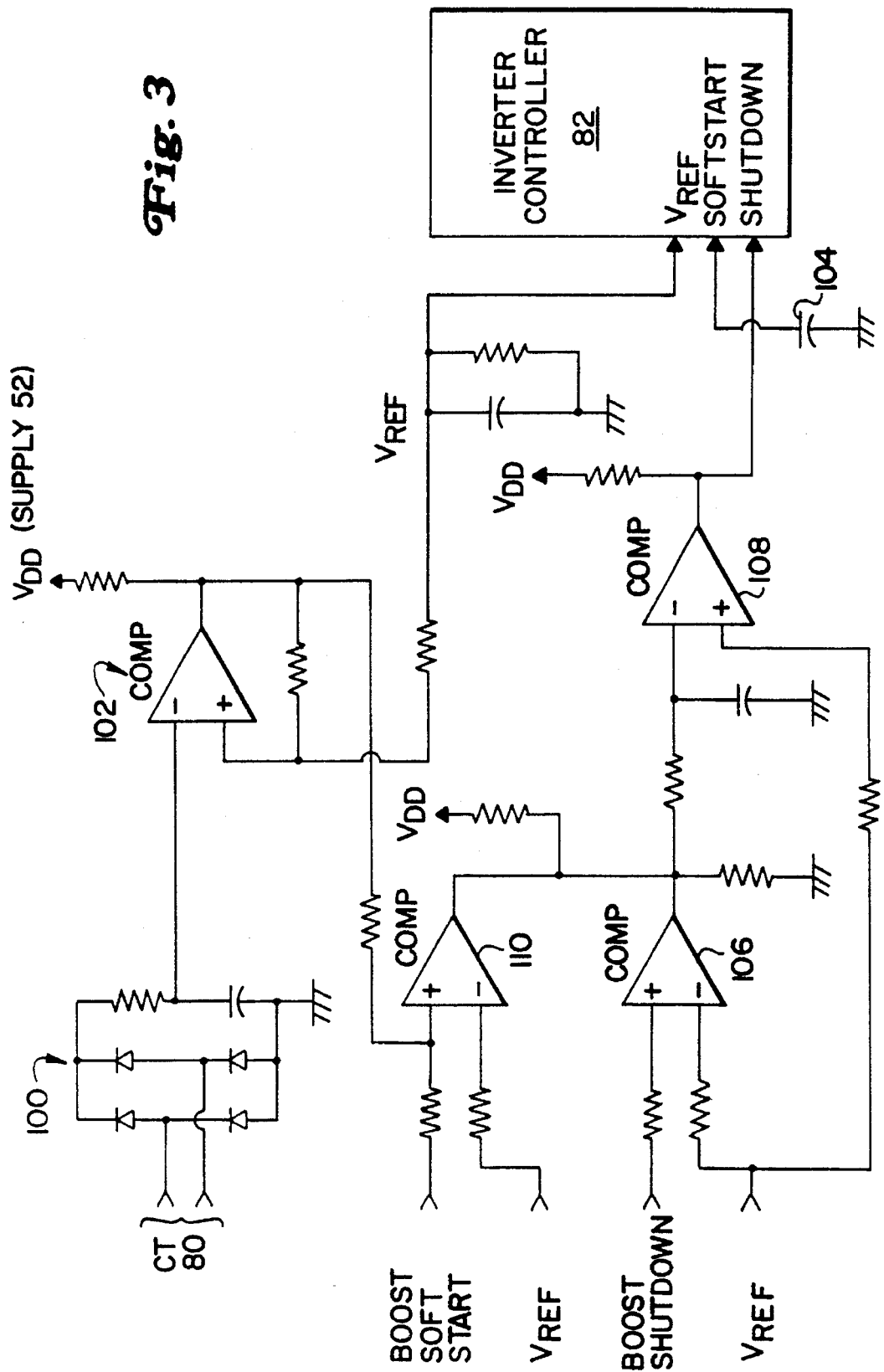
FIG. 3 is a simplified schematic representation of an undervoltage shutdown and current limit circuit for use in the power supply of FIG. 2.

FIG. 3 is an exemplary form of soft start, shutdown and current limit circuit. Current limit is implemented by first converting the signal from CT 80 to a DC value in a bridge rectifier circuit 100 and then comparing the DC value of the rectified signal to a voltage reference in a comparator 102. Soft start uses a capacitor 104 connected in series with resistor 105 between a current limit terminal of controller 50 and ground. Capacitor 104 is charged from a regulated 5 volt source in regulator 82 when power is applied to the system and when the shutdown signal to regulator 82 is low. This allows the controller 50 to gradually ramp up the output voltage of the boost circuit as the current limit increases with increasing charge/voltage on capacitor 104. The voltage on capacitor 104 is also compared to a selected reference voltage REF1 in a comparator 110 which inhibits operation of inverter controller 82 until the boost voltage reaches a selected reference value. The type UC1525 IC used as controller 82 includes a shutdown input terminal for implementing both an inhibit and shutdown function. The shutdown function is utilized in the event that the boost voltage on DC link 38 falls below a value which can be used to maintain the desired GTO gate drive voltage. Boost shut down compares boost voltage on the DC link 38 to a reference value in comparators 106 and 108. The second comparator 108 is used since it is desirable to inhibit operation at startup using comparator 110, i.e., comparator 106 shuts down the inverter 60 when boost voltage drops below a minimum value while comparator 110 inhibits startup until boost voltage rises above a minimum value. The output signal from comparator 108 is coupled to the shut-down terminal of controller 82.

Figure 4:
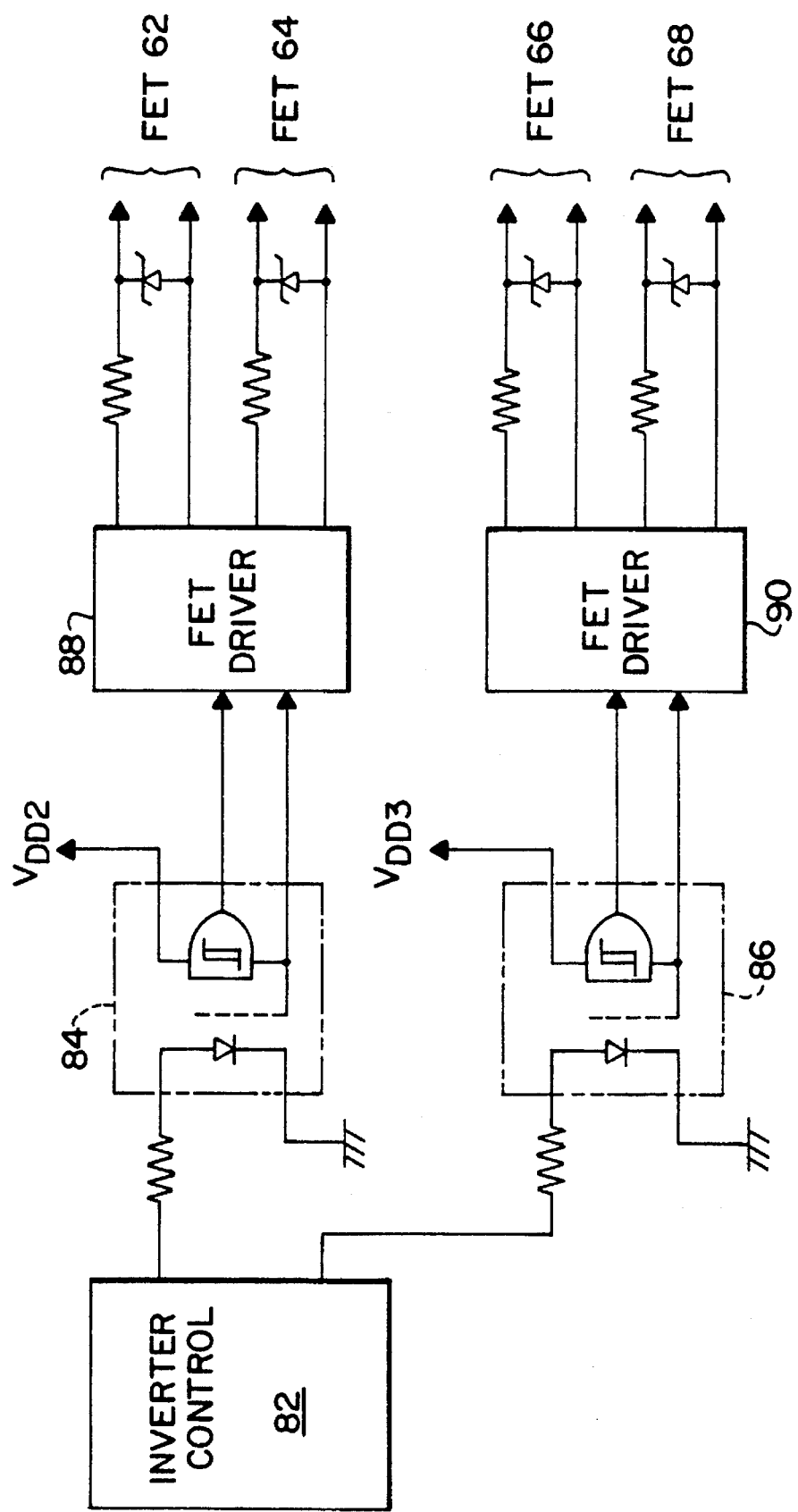
FIG. 4 is a simplified schematic representation of an optical coupler for use in the power supply of FIG. 2.

FIG. 4 illustrates the drive side of controller 82 showing signal coupling through optical couplers 84 and 86 to the pair of FET gate drive circuits 88 and 90. The characteristics of the drive signals from controller 82 are given in the manufacturer's specification. The FET drivers 88, 90 are the type IR2110 identified above.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A power supply for a gate drive circuit of a power inverter operable from a source of unregulated DC electric power for providing a desired value of regulated voltage, comprising:

an input filter circuit having input terminals connectable to an unregulated DC electric power source and having output terminals for providing a filtered value of a voltage at said input terminals;

a voltage boost circuit having input terminals coupled to said output terminals of said input filter circuit and having output terminals for providing a link voltage which is relatively high with respect to the desired value of regulated voltage, said boost circuit including at least one modulated solid state switching device selectively switchable between conducting and non-conducting states in response to switching signals, said device having a gate terminal for receiving switching signals;

a first control circuit for providing signals for selectively switching said switching device between conducting and non-conducting states, said control circuit being connecting for monitoring said link voltage of said boost circuit and controlling said conducting and non-conducting states in a manner to adjust said link voltage toward a desired value;

a first gate drive circuit coupled between said first control circuit and said boost circuit, said gate drive circuit having input terminals coupled for receiving said signals from said first control circuit and having output terminals coupled for supplying gate drive signals at a regulated power to said switching device in response to said signals from said first control circuit;

a first linear voltage regulator having a voltage input terminal coupled to receive said link voltage and a voltage reference terminal connected to a voltage reference terminal of said filter circuit, said first regulator providing a regulated DC voltage to said first control circuit for operation thereof; and a second linear voltage regulator having a voltage input terminal coupled to receive said link voltage and a voltage reference terminal connected to an output terminal of said switching device, said second regulator providing a regulated DC voltage to said gate drive circuit.

2. The power supply of claim 1 and including:

an inverter having at least one solid state switching device in each of a pair of switching legs, said inverter having a power input terminal connected to said DC link voltage and having a reference terminal connected to said voltage reference terminal of said filter circuit, each of said switching devices having a gate terminal and a power output terminal;

a second control circuit for providing signals for selectively switching each of said switching devices between conducting and non-conducting states such that said inverter provides an alternating current output at a selected voltage;

a second gate drive circuit coupled between said second control circuit and one of said switching devices in one of said inverter legs, said second gate drive circuit having input terminals for receiving selected ones of said signals from said second control circuit and having an output terminal coupled to said gate terminal of said one of said switching devices for supplying gate drive signals at a regulated power to said one of said switching devices in response to said selected ones of said signals;

a third gate drive circuit coupled between said second control circuit and another of said switching devices in another of said inverter legs, said third gate drive circuit having input terminals for receiving other selected ones of said signals from said second control circuit and having an output terminal coupled to said gate terminal of said another of said switching devices for supplying gate drive signals at a regulated power to said another of said switching devices in response to said other selected ones of said signals;

a third linear voltage regulator having a voltage input terminal coupled to said DC link voltage and having a voltage reference terminal connected to said power output terminal of said one of said switching devices, said third regulator providing a regulated DC voltage to said second gate drive circuit; and a fourth linear voltage regulator having a voltage input terminal coupled to said DC link voltage and having a voltage reference terminal connected to said power output terminal of said another of said switching devices, said third regulator providing a regulated DC voltage to said third gate drive circuit.

3. The power supply of claim 2 and including optical signal couplers between said second control circuit and each of said second and third gate drive circuits.

4. A power supply for a gate drive circuit of a power inverter operable from a source of unregulated DC electric power for providing a desired value of regulated voltage, comprising:

a voltage boost circuit having a boost voltage output coupled to a DC link and a ground reference terminal coupled to a ground bus, said circuit further including a switching device having a power terminal coupled to said ground bus and a control terminal coupled for receiving switching signals;

a gate drive circuit coupled for supplying switching signals to said switching device;

a first linear voltage regulator having a voltage input terminal coupled to receive said link voltage and a voltage reference terminal connected to said power terminal of said switching device, said first regulator providing a regulated DC voltage to said gate drive circuit for operation thereof;

an inverter having at least one solid state switching device in each of a pair of switching legs, said inverter having a power input terminal connected to said DC link and having a reference terminal connected to said ground bus, each of said switching devices having a gate terminal and a power output terminal;

a second gate drive circuit coupled for supplying gating signals to at least one of said switching devices in one of said inverter legs; and a second linear voltage regulator having a voltage input terminal coupled to said DC link voltage and having a voltage reference terminal connected to said power output terminal of said one of said switching devices, said second regulator providing a regulated DC voltage to said second gate drive circuit.

5. A power supply for a gate drive voltage supply system for a power inverter, the system being coupled to receive a variable DC voltage and operable to produce a regulated DC output voltage to each of a plurality of distributed electronic switching devices, the system including a plurality of linear voltage regulators with each respective one of said regulators having a power input terminal coupled to a common DC link, each of said regulators further having a ground reference terminal connected to a ground reference power terminal of a corresponding one of said switching devices.

6. A method for minimizing ground loop differential voltages in a gate drive power supply circuit for a power inverter, the method comprising the steps of:

providing a DC voltage source having a voltage output substantially greater than a desired regulated gate drive voltage;

coupling an isolated gate drive to each switching device used in the power supply circuit;

providing a voltage regulator for each gate drive with each regulator having a power input terminal connected to a common voltage source and further having a ground reference terminal connected to a ground power terminal of a corresponding switching device.

* * * * *